March 7, 1967 R. S. BAGWELL, JR 3,307,852

RECORD PLAYER APPARATUS

Filed July 27, 1964 2 Sheets-Sheet 1

INVENTOR.
RICHARD S. BAGWELL, JR.
BY Eugene M. Whitacre
Attorney

RECORD PLAYER APPARATUS

Filed July 27, 1964 2 Sheets-Sheet 2

INVENTOR.
RICHARD S. BAGWELL, JR.
BY Eugene M. Whitacre
Attorney 3,307,852
RECORD PLAYER APPARATUS Richard S. Bagwell, Jr., Indianapolis, Ind., assignor to Radio Corporation of America, a corporation of Delaware Filed July 27, 1964, Ser. No. 385,106
8 Claims. (Cl. 274—23)

This invention relates to tone arm assemblies for phonograph record players.

Phonograph tone arm assemblies normally have an arm of desired length which is pivotally coupled at one end to a support post so that the opposite end is free to move in both lateral and vertical directions. The pickup assembly including a record engaging stylus is mounted at the free end of the arm. The lateral movement of the tone arm permits the stylus to follow the record groove spiral toward the center of a record being played, and vertical movement allows the stylus to follow warped records. The pivotal mounting of the tone arms is such as to prevent rotation of the tone arm about its longitudinal axis.

In general, prior tone arm mounting assemblies consisted of a plurality of components. A number of fastening devices such as pins or screws were used to keep the tone arm in place and still allow a desired degree of freedom of movement in the lateral and vertical directions. Such tone arm mounting assemblies are not only complex and difficult to manufacture, but require considerable labor and expense to assemble and adjust.

It is therefore an object of this invention to provide a new and improved low cost, simplified record tone arm assembly.

It is also an object of this invention to provide a new and improved simplified tone arm assembly that requires no adjustment in its assembly.

It is still a further object of this invention to provide a new and improved low cost detachable tone arm assembly that may be discarded when the pickup becomes defective.

The phonograph tone arm assembly of the present invention comprises primarily two components, a unitary support post including a ball type socket portion and a tone arm with a resilient snap type socket joint. The socket joint on the tone arm includes two resilient side wall extension tabs formed with aligned apertures, each aperture having a diameter less than the support post ball. The tone arm is mounted on the support post by exerting sufficient pressure to cause the resilient socket to snap onto the ball. The ball and socket joint comprises the only means of coupling between the arm and the support post whereby the arm can be attached or detached from the support post by merely applying a force in the required direction. The coupling provided by the ball and socket joint includes a suitable guideway that captures a portion of the support post to prevent the rotation of the tone arm about its longitudinal axis without impairing the lateral and vertical movement of the tone arm.

An additional feature of the invention includes co-acting cam portions on the tone arm and the support post to limit the lateral and vertical travel of the arm with respect to the support post.

Figures 1, 2, 3, 4, 5:
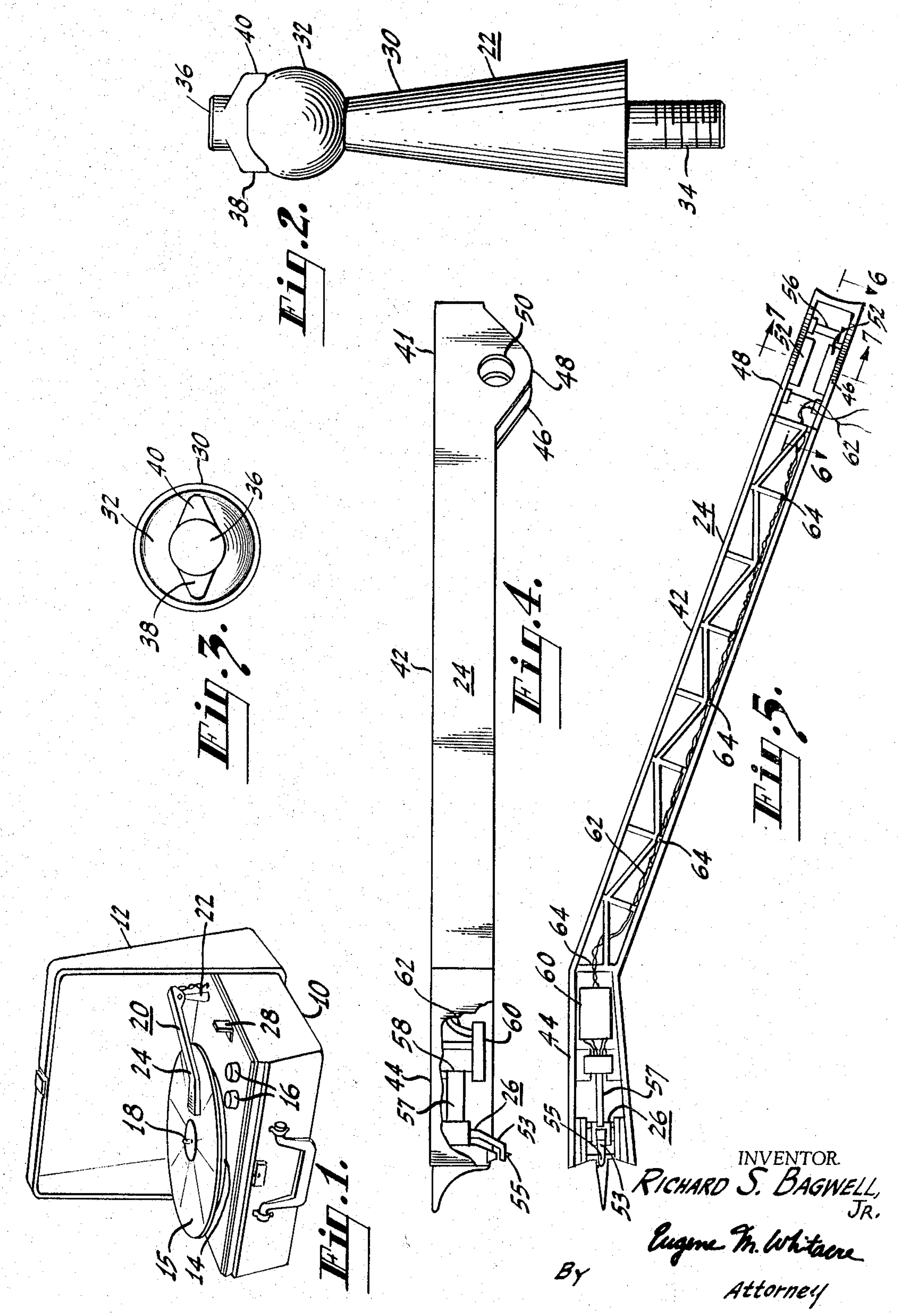
FIGURE 1 is a perspective view of a portable phonograph record player embodying the tone arm assembly of the invention.
FIGURE 2 is a side view of the support post of the tone arm assembly.
FIGURE 3 is a top view of the support post of FIGURE 2.
FIGURE 4 is a side view of the tone arm with a portion broken away to illustrate the mounting of the pickup assembly.
FIGURE 5 is a bottom view of the tone arm of the tone arm of FIGURE 4.

In referring to the drawings, like elements and parts are designated by like reference characters throughout the figures. FIGURE 1 is a perspective view of a portable record player embodying the tone arm assembly of the invention. The portable record player, as shown, comprises two portions, a cover member 12 and a base member 10. The player mechanism and its associated equipment is mounted in the base member 10 and in the present example includes a turntable 14 having a record 15 thereon, controls 16, a spindle 18, a tone arm assembly 20, a tone arm rest 28, with the amplifier, speaker, etc. mounted within the base.

The tone arm assembly 20 essentially comprises two components, the support post 22, and a tone arm 24. The tone arm 24 includes a pickup assembly 26 attached thereto. The support post 22 provides a stationary ball coupling joint about which the tone arm can rotate as it tracks the record 15. The tone arm 24 and support post 22 can be made of any suitable material, such as metal or plastic. Polypropylene plastic has been found to be a suitable material due to its toughness and self-lubricating characteristics.

The support post 22 in the present example (shown in FIGURES 2 and 3), comprises as an integral unit, a tapered body 30 having a generally spherical or ball shaped top portion 32 with a threaded extension 34 extending from the bottom. The cross sectional configuration of the body 30 may be circular as shown, or may be of other configurations such as cross shaped. The threaded extension 34 of the support post 22 screws into a threaded aperture in the record player turntable. If desired the extension 34 may be received in a resiliently mounted nut on the turntable to prevent acoustical feedback.

The sphere 32 is formed with an extended portion comprising a cylindrical shaped cap 32 and two cam portions 38 and 40 extending in opposite directions along the upper surface of the sphere 32. The vertical dimensions of cams 38 and 40 (as viewed in FIGURE 2) are less than that of the cap 36.

The tone arm 24, as shown in FIGURES 4 and 5 includes a mounting end 41 having two resilient tabs 46 and 48 extending downwardly from the arm 24, as viewed in FIGURE 4. Both of the resilient tabs 46 and 48 have an aligned hole or aperture 50 having a diameter less than that of the sphere 32. The holes 50 along with tabs 46 and 48 form the socket portion of the ball and socket joint of the tone arm assembly 20.

The tone arm 24 is coupled to the support post 22 by placing the tabs 46 and 48 over the sphere 32 with the xis of the tone arm 24 aligned with the axis of the cams 3 and 40, and applying sufficient pressure to snap the ›ne arm into place. Tabs 46 and 48 resiliently grip ıd hold the sphere 32 in the socket holes 50. The stiff-ess of the tabs retains the tone arm 24 in place while lowing an ample degree of freedom of movement so ıat the tone arm 24 tracks the record 15 without any ppreciable friction drag. The tone arm 24 is as easily ecoupled from the support post by merely applying an xtracting force to overcome the resilient capturing force f tabs 46 and 48.

The pickup assembly 26, as shown in FIGURES 4 and , includes a stylus beam 53 with an attached stylus 55 onnected to a piezoelectric electromechanical transducer 7 having a stationary end 58 rigidly mounted in the tone rm 24. The pickup assembly 26 may comprise an in-egral part of the tone arm 24 (as shown) creating a dis-osable tone arm and pickup combination that is replace-ble as a unit when the stylus assembly 26 becomes defec-ve. The additional expense of the plastic tone arm 24 dds very little to the cost of the overall unit when com-ared to the replacement of the pickup assembly alone. s an alternative, the pickup assembly 26 can be inde-endently mounted to form a replaceable type cartridge 'hich can be changed without discarding the tone arm 4. In either case, a detachable plug 60 is provided for onnecting the pickup assembly 26 to the phonograph mplifier input through wires 62. As shown in FIGURE , the tone arm 24 can be electrically and physically dis-onnected from the phonograph amplifier by detaching lug 60 and removing wires 62 from the wire mounting rooves 64.

Figures 6, 7, 8, 9, 10, 11:
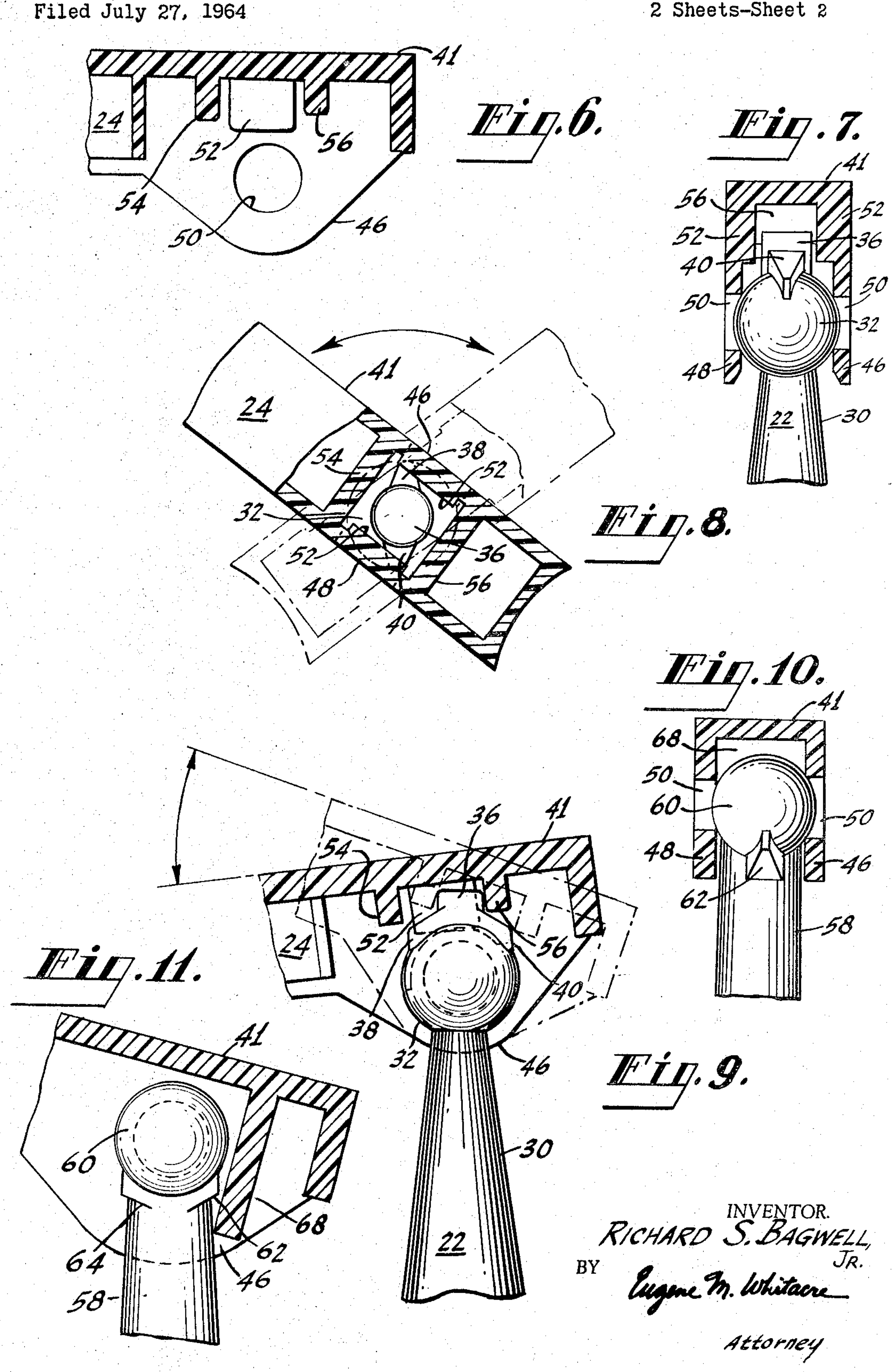
FIGURE 6 is a sectional view of the socket joint portion of the tone arm taken on the section lines 6—6 of FIGURE 5.
FIGURE 7 is a sectional view of the socket portion of the tone arm taken on the section lines 7—7, of FIGURE 5, and shown attached to the support post of FIGURE 2.
FIGURE 8 is a broken away top view of the tone arm assembly illustrating the limited angle of lateral motion between the tone arm and support post.
FIGURE 9 shows a broken away side view of the tone arm assembly, illustrating the limited angle of vertical motion.
FIGURE 10 is a broken away end view of a modification of the tone arm assembly.
FIGURE 11 is a broken away side view of a modifica- of the support portion of the tone arm assembly of FIGURE 10.

The operation of ball and socket support and pivot oint will best be understood by references to FIGURES to 9. FIGURE 6 is a broken away view of the mount-ıg end 41 of the tone arm 24 along lines 6—6 of FIG-IRE 5. Extending inwardly and above the apertures 50 ı both tabs 46 and 48, as an integral part of a tone arm 4, are two rectangularly shaped side wall extensions or osses 52. The thicknesses of the bosses 52 provide an ıternal dimension between the bosses that is slightly reater than the diameter of the support post cap 36 as ıown in FIGURE 7. The combination of the bosses 52 rovide a guideway that captures the cap 36 and prevents ıe tone arm 24 from rotating about its longitudinal axis, ut still allows freedom of rotation in both the lateral and ertical directions.

The combination of, the ball and socket joint, the sup-ort post cap 36, and the bosses 52 form a complete work-ıg tone arm pivotal support means. The addition of the ams 38 and 40 provides the added feature of limiting the ıteral rotation of the pickup arm 24. This is desirable ) prevent the accidental breaking of the wires 62 due to xcessive rotation of the tone arm 24. As shown in FIG-IRE 8, the counterclockwise rotation of the tone arm 24, s viewed from the top of the tone arm, is limited when ither the cam 38 abuts against the tab 46 or the cam 40 buts against the tab 48 or both. A clockwise rotation as shown in phantom in FIGURE 8) is limited when ither the cam 40 abuts against the tab 46 or the cam 38 buts against the tab 48 or both. This lateral rotational imit prevents any further rotation beyond the limit oints regardless of the vertical positioning of the tone rm 24 with respect to support post 22.

A vertical limit is provided by the addition of lugs or am portions 54 and 56 on the tone arm 24 extending be-ween the sides of the tone arm on both ends of bosses 2 perpendicular to the longitudinal axis of the tone arm ortion 42 as shown in FIGURES 5, 6, 8 and 9. FIG-JRE 9 illustrates the vertical limiting provided by the tone rm assembly. If the tone arm 24 is pivoted downward-y the cam 56 abuts against the support post cap 36 pre-enting any further downward motion. If the tone arm 4 is pivoted upward, the cam 54 abuts against the cap 6 and thereby prevents any further upward motion (as shown in phantom in FIGURE 9). These vertical stop limits prevent vertical rotation beyond the preset limits regardless of the lateral motion of the tone arm 24. The vertical rotational limitations are desirable to prevent the tone arm 24 from being damaged by being caught in the cover member 12 if it should accidently drop out of the open position while the tone arm (without vertical limits) is rotated upward beyond the pivot point.

Since the lateral and vertical limits will operated inde-pendently of each other, the pickup arm assembly can in-corporate either the lateral or vertical limits, both or either however desired.

The tone arm assembly 20 may be modified by incorpo-rating the rotational limit elements on a portion of the support post located between the support post body and the bottom of the sphere as illustrated in FIGURES 10 and 11. The portion of the tone arm assembly 20 that remains substantially unchanged will be designated by the same numerals as previously applied in FIGURES 1 to 9.

As shown in FIGURE 10, the support post body 58 has a cylindrical shape rather than a conical shape previously described. A sphere or ball 60 is formed on the top por-tion of the cylindrical body 58 to provide the ball por-tion of the ball and socket joint. The mounting portion 41 of the tone arm 24 is formed with the resilient tabs 46 and 48 each having a hole or aperture 50, as previously described. This combination provides the socket portion of the ball and socket joint. The diameter of the support post body 58 is less than that of a sphere 60 but only slightly less than the spacing between the tabs 46 and 48. The tone arm 24 will snap on the support post of FIGURE 10 as previously described in regards to FIG-URES 1 to 9. The tone arm 24 while in place on the sup-port post is free to rotate laterally and vertically as previ-ously described but its rotation along its longitudinal axis is limited by the close fit between the support post body 58 and tabs 46 and 48.

Lateral rotational limits are provided by including cams 62 and 64 between the junction of the sphere 60 and the support post body 58. The cams 62 and 64 operate to limit the lateral rotational by abutting against the respec-tive resilient tab 46 and 48 in the same manner as previ-ously described in regards to FIGURES 1 to 9.

In the present example, only the upward rotation tone arm 24 is limited in FIGURE 11 by the inclusion of a lug or cam 68 extending perpendicular to the longitudinal axis of the tone arm 24 between the tabs 46 and 48. The cam 68 abuts against the support post body 58 preventing any further upward motion. The downward motion can be limited in a similar manner by including a second cam on the opposite side of the ball and socket joint so that it can abut against the support post body 58, to prevent any further downward motion.

What is claimed is:

1. In a phonograph record player:

a unitary support post including a generally spherically shaped portion, and an elongated tone arm having a mounting end includ-ing a pair of spaced generally parallel side walls being formed with aligned apertures therein, said tone arm being positioned over said support post so that the spherically shaped portion of said support post and the aligned apertures in said spaced side walls define a ball and socket joint permitting rota-tional movement of said tone arm, a guideway formed in said tone arm for capturing a portion of said support post to limit the rotation of said tone arm about its longitudinal axis.

2. In a phonograph record player:

a unitary support post including a generally spherically shaped portion;

a tone arm having a mounting end including a pair of spaced side walls being formed with aligned aper-tures therein, said tone arm being positioned over said support post so that the spherically shaped end portion of said support post and the aligned aperture in said spaced flexible walls define a ball and socket joint permitting rotational movement of said tone arm; said pair of side walls forming a guideway for said support post to limit the direction of rotation of said tone arm to the vertical and lateral direction, and said support post and said tone arm mounting end including coacting cam portions that limit the angle of lateral and vertical rotation of said tone arm with respect to the support post.

3. A two-piece phonograph tone arm assembly comprising:

a support mounting post formed with a generally spherically shaped portion, and a tone arm formed with a resilient socket support joint, said socket joint being capable of snapping over and resiliently capturing said support post spherical portion thereby defining a ball and socket pivot point for said tone arm, a portion of said tone arm forming a guideway for a portion of said support post to limit the rotation of said tone arm about its longitudinal axis.

4. A phonograph tone arm assembly comprising:

a support post including a spherical top;

a tone arm having a resilient socket support joint at one end of said tone arm, said socket joint comprising of a pair of resilient tabs, each of said tabs being formed with a hole having a diameter smaller than said post spherical top;

said resilient socket joint being capable of snapping over said post spherical top to resiliently capture said post spherical top between said tab holes thereby forming a ball and socket pivot point for said tone arm;

said support post sphere being formed with a cylindrical shaped cap on top of said spherical top, and said tone arm socket joint being formed with a pair of internal bosses at a predetermined distance above said tab holes so as not to interfere with the ball and socket joint, said pair of bosses forming a guideway for said support post cap to restrict the rotation of said tone arm to lateral and vertical movement.

5. A phonograph tone arm assembly comprising:

a fixedly mounted support post including a spherical upper portion;

a tone arm having a pair of generally parallel side walls, each of the side walls near one end of the tone arm being formed with a circular hole of a diameter less than diameter of said spherical upper portion, the center of the holes being located on a line generally normal to both side walls, said side walls being spaced apart less than the diameter of said spherical upper portion and being flexible enough to snap over and receive said spherical upper portion in said holes and thereby form a ball and socket pivot point for said tone arm, and said tone arm end including a longitudinally extending guideway that captures a portion of said support post to limit the rotation of said tone arm about its longitudinal axis.

6. A phonograph tone arm assembly comprising:

a fixedly mounted support post including a spherical upper portion;

a tone arm having a pair of generally parallel and vertical side walls joined at the upper edges by a generally horizontal top wall, the side walls near one end of the tone arm having aligned apertures of a diameter smaller than the diameter of said spherical upper portion, said side walls being spaced apart less than the diameter of said spherical upper portion and being sufficiently flexible to snap over and receive said spherical upper portion in said apertures and thereby form a ball and socket pivot point for said tone arm, said support post including a cylindrical cap portion projecting above said spherical portion;

said tone arm including a longitudinally extending guideway of a lateral dimension closely approximating the diameter of said cap portion and located to receive said cap portion when said tone arm is mounted on said support post;

a pair of cam portions extending in opposite directions from said support post cap and following the surface of said sphere said cams adapted to abut against said side walls after a predetermined rotation of said tone arm in a hoirzontal plane to limit the rotation of said tone arm in a horizontal plane, and cams at each end of said guideway adapted to abut against said support post cap after a predetermined rotation of said tone arm in a vertical plane to limit the rotation of said tone arm in a vertical plane.

7. A phonograph tone arm assembly comprising:

a fixedly mounted support post including a spherical upper portion;

a tone arm having a pair of generally parallel side walls, one end of said tone arm side walls being formed with a socket comprising aligned inner recesses said recesses having the general shape of a segment of a sphere with its inner wall boundary having a diameter less than that of said spherical upper portion, said side walls being spaced apart less than the diameter of said spherical upper portion and being flexible enough to snap over and receive said spherical upper portion in said holes and thereby form a ball and socket pivot point for said tone arm, and said tone arm end including a guideway that captures a portion of said support post to limit the rotation of said tone arm about its longitudinal axis.

8. A disposable tone arm for a fixedly mounted support post with a generally spherically shaped upper portion comprising in combination:

a pair of generally parallel side walls, one end of said tone arm side walls being spaced apart less than the horizontal dimension of said spherically shaped upper portion of said support post;

said end of said side walls being formed with a resilient socket support joint, said resilient support joint being capable of snapping over and resiliently capturing said spherically shaped support post upper portion forming a ball and socket pivot point for said tone arm;

a portion of said tone arm forming a guideway for a portion of said support post to limit the rotation of said tone arm about its longitudinal axis, and a pickup assembly mounted on said tone arm at a point remote from said socket support joint.

References Cited by the Examiner

UNITED STATES PATENTS

| | | | |
|---|---|---|---|
| 856,321 | 6/1907 | Wappler | 24( |
| 1,830,800 | 11/1931 | McClatchie | 274—2: |
| 2,466,201 | 4/1949 | Boudreaux | 274—2: |
| 3,006,652 | 10/1961 | Mankovity | 274—2: |

NORTON ANSHER, *Primary Examiner.*

CLIFFORD B. PRICE, *Examiner.*